(12) United States Patent
Dorbolo

(10) Patent No.: US 7,805,540 B1
(45) Date of Patent: Sep. 28, 2010

(54) METHOD AND SYSTEM FOR REPROGRAMMING INSTRUCTIONS FOR A SWITCH

(75) Inventor: Riccardo G. Dorbolo, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 1290 days.

(21) Appl. No.: 11/316,518

(22) Filed: Dec. 20, 2005

Related U.S. Application Data

(63) Continuation of application No. 09/628,532, filed on Jul. 31, 2000, now Pat. No. 6,978,309.

(51) Int. Cl.
G06F 15/16 (2006.01)
G06F 15/00 (2006.01)
G06F 15/76 (2006.01)
G06F 9/44 (2006.01)

(52) U.S. Cl. ..................... 709/250; 713/16; 713/17; 713/244

(58) Field of Classification Search ............. 709/231, 709/250; 711/108, 215, 219, 220; 712/16, 712/17, 34, 35, 244
See application file for complete search history.

(56) References Cited

U.S. PATENT DOCUMENTS

| | | | | |
|---|---|---|---|---|
| 5,204,836 | A * | 4/1993 | Reed | 365/200 |
| 5,570,362 | A | 10/1996 | Nishimura | 370/60.1 |
| 5,577,039 | A | 11/1996 | Won et al. | 370/60.1 |
| 5,598,409 | A | 1/1997 | Madonna et al. | 370/364 |
| 5,721,819 | A | 2/1998 | Galles et al. | 709/243 |
| 5,734,653 | A | 3/1998 | Hiraiwa et al. | 370/395 |
| 5,848,067 | A | 12/1998 | Osawa et al. | 370/394 |
| 5,889,947 | A * | 3/1999 | Starke | 709/213 |
| 5,943,339 | A | 8/1999 | Mauger | 370/397 |
| 6,021,265 | A * | 2/2000 | Nevill | 712/209 |
| 6,026,467 | A * | 2/2000 | Petty | 711/108 |
| 6,097,515 | A | 8/2000 | Pomp et al. | 398/45 |
| 6,112,294 | A * | 8/2000 | Merchant et al. | 712/219 |
| 6,147,988 | A | 11/2000 | Bartholomew et al. | 370/352 |
| 6,167,025 | A | 12/2000 | Hsing et al. | 370/216 |
| 6,243,382 | B1 | 6/2001 | O'Neill et al. | 370/395 |
| 6,256,293 | B1 | 7/2001 | Gerstel et al. | 370/228 |
| 6,389,024 | B1 | 5/2002 | Ghai et al. | 370/395.31 |

(Continued)

OTHER PUBLICATIONS

ITU-T Recommendation I.363, Integrated Services Digital Network (ISDN), Overall Network Aspects and Functions, B-ISDN ATM Adaptation Layer (AAL) Specification, Mar. 1993, 99 pages.

(Continued)

*Primary Examiner*—Tonia L Dollinger
*Assistant Examiner*—Steven C Nguyen
(74) *Attorney, Agent, or Firm*—Baker Botts L.L.P.

(57) ABSTRACT

The method and system for reprogramming instructions for a switch includes programming a redirection memory to associate a routing parameter set in a routing memory for the switch with a first line card. The routing parameter set includes a plurality of routing parameters to be provided to the switch to service the first line card. In response to an event initiating activation of a second line card in place of the first line card, the redirection memory is reprogrammed to associate the routing parameters set in the routing memory with the second line card.

18 Claims, 3 Drawing Sheets

U.S. PATENT DOCUMENTS

| | | |
|---|---|---|
| 6,404,782 B1 | 6/2002 | Berenbaum et al. .......... 370/522 |
| 6,442,167 B1 | 8/2002 | Aramaki et al. ........ 370/395.43 |
| 6,621,828 B1 | 9/2003 | Field et al. .................. 370/466 |
| 6,628,657 B1 | 9/2003 | Manchester et al. ...... 370/395.1 |
| 6,674,755 B1 | 1/2004 | Potter et al. ................. 379/395 |
| 6,715,097 B1 | 3/2004 | Kidder et al. ................... 714/2 |
| 6,724,728 B1 | 4/2004 | Manchester et al. ......... 370/236 |
| 6,760,327 B1 | 7/2004 | Manchester et al. ......... 370/364 |
| 6,778,529 B1 | 8/2004 | Field et al. .................. 370/353 |
| 6,791,939 B1 | 9/2004 | Steele et al. ................ 709/238 |
| 6,822,960 B1 | 11/2004 | Manchester et al. ......... 370/394 |
| 6,839,833 B1 * | 1/2005 | Hartnett et al. ............. 712/229 |
| 6,920,156 B1 | 7/2005 | Manchester et al. ......... 370/522 |
| 6,944,153 B1 | 9/2005 | Buckland et al. ............ 370/376 |

OTHER PUBLICATIONS

ITU-T Recommendation I.363.1, Series I: Integrated Services Digital Network, Overall Network Aspects and Functions, Protocol Layer Requirements, B-ISDN ATM Adaption Layer Specification: Type 1 AAL, Mar. 1993 47 pages, Aug. 1996.

Bellcore GR-253-CORE, "Synchronous Optical Network (SONET) Transport Systems: Common Generic Criteria," Issue 2, Dec. 1995 (with rev. 2 Jan. 1999), 788 pages.

The ATM Forum, Technical Committee, "Circuit Emulation Service Interoperability Specification," Version 2.0, Jan. 1997, AF-VTOA-0078.000, 101 pages.

The ATM Forum, "Specifications of (DBCES) Dynamic Bandwidth Utilization—in 64Kbps Time Slot Trunking over ATM—Using CES," Jul. 1997, AF-VTOA-0085.000, 32 pages.

Bellcore GR-2837-CORE, "ATM Virtual Path Ring Functionality in SONET—Generic Criteria," Issue 4, Feb. 1998, 154 pages.

International Telecommunication Union, Series I: Integrated Services Digital Network, Maintenance Principles, "B-ISDN operation and maintenance principles and functions," Feb. 1999, 116 pages.

"About ATM" www.atmforum.com/atmforum/library/notes1, 2, 3, 4 and 5 printed Aug. 30, 1999, 5 pages.

U.S. Appl. No. 09/390,420, entitled "Method and System for Transmitting Traffic Having Disparate Rate Components," filed Sep. 3, 1999, 30 pages.

"Asynchronous Transfer Mode (ATM) Switching," printed from www.cisco.com on Aug. 27, 2002, 19 pages.

* cited by examiner

| REDIRECTION MEMORY 130 | |
|---|---|
| INSTRUCTION SET (LINE CARD) 1 | INSTRUCTION SET 1 |
| INSTRUCTION SET (LINE CARD) 2 | INSTRUCTION SET 30 |
| INSTRUCTION SET (LINE CARD) 3 | INSTRUCTION SET 3 |
| ⋮ | ⋮ |
| INSTRUCTION SET (LINE CARD) 30 | INSTRUCTION SET 2 |
| INSTRUCTION SET (LINE CARD) 31 | INSTRUCTION SET 31 |
| INSTRUCTION SET (LINE CARD) 32 | INSTRUCTION SET 32 |

METHOD AND SYSTEM FOR REPROGRAMMING INSTRUCTIONS FOR A SWITCH

CROSS REFERENCE TO RELATED APPLICATION

This application is a continuation of U.S. application Ser. No. 09/628,532 filed Jul. 31, 2000 now U.S. Pat. No. 6,978,309 and entitled "Method and System for Reprogramming Instructions for a Switch".

TECHNICAL FIELD OF THE INVENTION

This invention relates generally to the field of telecommunication switching, and more particularly to a method and system for reprogramming instructions for a switch.

BACKGROUND OF THE INVENTION

The Internet has dramatically increased the potential for data, voice, and video services for customers. Existing circuit-switched telephony systems, however, do not provide the foundation to support the growing need for bandwidth and new services required by both residential and business consumers. As a result, integrated access devices (IADs) have been introduced to support Internet and related technologies as well as standard telephony service for customers.

IADs often combine synchronous and asynchronous transport and switch functionality to multiplex data, voice, and video traffic together onto a single network. Within an IAD, a time division multiplex (TDM) bus is typically used to transport voice and other synchronous traffic between the line cards and a switch core. An asynchronous transfer mode (ATM) bus is used to transport ATM traffic between the line cards and the switch core.

At the switch core, ATM traffic normally arrives asynchronously while TDM traffic arrives in a regular and periodic fashion. Separate ATM and TDM switch hardware are provided to receive and process the ATM and TDM traffic, respectively.

Typically, the TDM traffic is switched by a synchronous switch such as a time slot interchanger (TSI) that cross-connects the TDM channels based on switching instructions in a switching memory. The switching instructions are pre-programmed into the switching memory by a processor and may be altered by the processor in response to protection switching and other events.

For 1:N protection switching, a standby card in the system is provided to be activated in case one of a number of designated cards malfunctions. When a defect is detected in an operating card and the standby card is activated in its place, the switching memory for the TSI is reprogrammed to write each instruction for the failed card to the instructions for the activated card. This reprogramming of the switching memory involves a large number of microprocessor operations which are relatively time consuming. As a result, protection switching is slowed down in the TSI and may not conform to some telecommunication standards.

SUMMARY OF THE INVENTION

The present invention provides a method and system for reprogramming instructions or other routing parameters for a time slot interchanger (TSI) or other switch that substantially eliminates or reduces problems and disadvantages associated with previous systems and methods. In particular, each set of routing parameters in a routing memory is selectively associated with a line card in a redirection memory that can be reprogrammed to switch a routing parameter set for a failed line card to a protect line card with minimal processor operations.

In accordance with one embodiment of the present invention, a method and system for reprogramming instructions for a switch includes programming a redirection memory to associate a routing parameter set in a routing memory for the switch with a first line card. The routing parameter set includes a plurality of routing parameters to be provided to the switch to service the first line card. In response to an event initiating activation of a second line card in place of the first line card, the redirection memory is reprogrammed to associate the routing parameter set in the routing memory with the second line card.

More specifically, in accordance with a particular embodiment of the present invention, the routing parameters are instructions, the routing parameter set is an instruction set and the routing memory is an instruction memory for a synchronous switch. In this and other embodiments, the event may be a failure of the first line card. The redirection memory may be initially programmed to associate a second instruction set in the instruction memory with the second line card. The second instruction set includes a plurality of instructions to be provided to the synchronous switch to service the second line card. In response to the event initiating activation of the second line card in place of the first line card, the redirection memory is reprogrammed to associate the second instruction set with the first line card. In this way, instruction sets are switched between the line cards. The synchronous switch may be a time slot interchanger (TSI) or other suitable switch.

In accordance with one aspect of the present invention, instructions are provided to the synchronous switch by generating a count value including a first portion and a second portion. The second portion is operable to identify a relative location in one of a plurality of instruction sets in an instruction memory for the synchronous switch. The redirection value is determined for the first portion of the count value based on the first portion of the count value. The redirection value identifies an instruction set in the instruction memory. An instruction is read from the relative location in the instruction set based on the redirection value and the second portion of the count value. In a particular embodiment, the count value is a unitary value in which the first portion comprises a set of most significant bits (MSB) of the unitary value and the second portion comprises a set of least significant bits (LSB) of the unitary value.

Technical advantages of the present invention include providing an improved method and system for reprogramming routing parameters for a switch, such instructions for a TSI. In particular, each set of instructions in the instruction memory is selectively associated with a line card in a programmable redirection memory. The redirection memory may be reprogrammed with minimal processor operations to switch an instruction set of a failed line card to a protect line card. As a result, processor operations and cycles are reduced for protection switching. Thus, protection switching occurs rapidly and within the time required by the telecommunication standards.

Another technical advantage of the present invention includes providing an improved TSI or other suitable switch. In particular, the TSI includes an instruction memory and a redirection memory for associating instruction sets with the line cards serviced by the TSI. The redirection memory adds a level of indirection to the TSI that allows N:1 protection switching reprogramming to be performed with only two processor operations. Accordingly, the TSI operates more efficiently and within telecommunication standards.

Other technical advantages of the present invention will be readily apparent to one skilled in the art from the following figures, description, and claims.

BRIEF DESCRIPTION OF THE DRAWINGS

For a more complete understanding of present invention and its advantages, reference is now made to the following description taken in conjunction with the accompanying drawings, wherein like reference numerals represent like parts, in which.

DETAILED DESCRIPTION OF THE INVENTION

Figure 1:
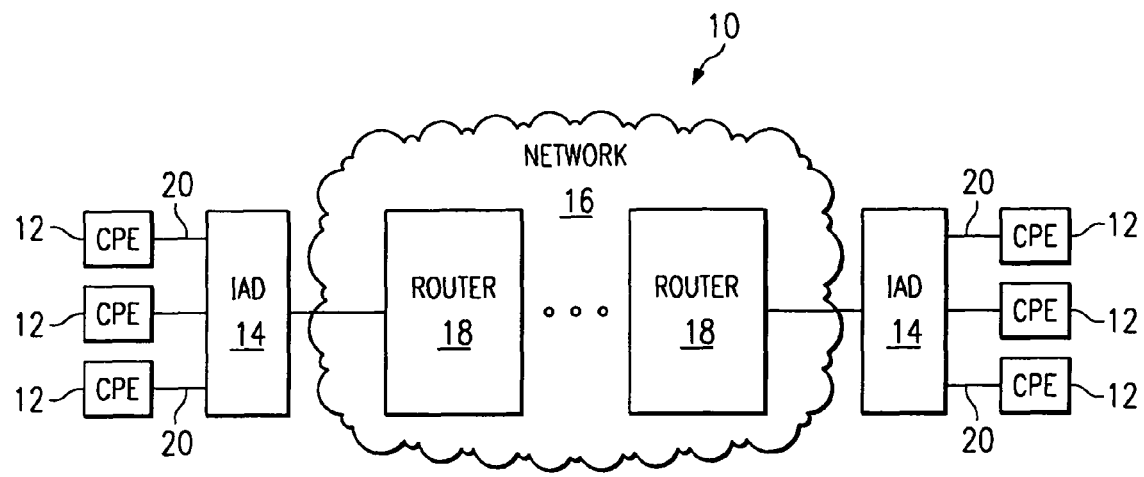
FIG. 1 is a block diagram illustrating a telecommunications system in accordance with one embodiment of the present invention.

FIG. 1 illustrates a telecommunications system 10 in accordance with one embodiment of the present invention. The telecommunications system 10 transmits voice, data, video, other suitable types of information, and/or a combination of different types of information between source and destination points.

Referring to FIG. 1, the telecommunications system 10 includes customer premise equipment (CPE) 12 and integrated access devices (IADs) 14 connecting the CPE 12 to a network 16. The IADs 14 communicate voice, data, and/or video traffic between the CPE 12 and the network 16.

The CPE 12 includes standard telephones, modems, computers, dataphones, and other devices capable of generating traffic for transmission in the telecommunications system 10. The CPE 12 is connected to the IADs 14 through a communication link 20. The communication link 20 may be a T1 line, conventional twisted pair cable, fiber optic, or other suitable type of wireline and/or wireless link.

The network 16 may include portions of the Internet, one or more intranets, other wide or local area networks, telephony switches such as a class 5 switch and the like. In a particular embodiment, the network 16 includes backbone routers 18 at its borders for communicating with the IADs 14. In this embodiment, the backbone routers 18 may be Cisco 12000 routers. It will be understood that different types of backbone routers 18 as well as different types of devices capable of directing, switching, or otherwise routing traffic may be used in connection with the present invention.

Figure 2:
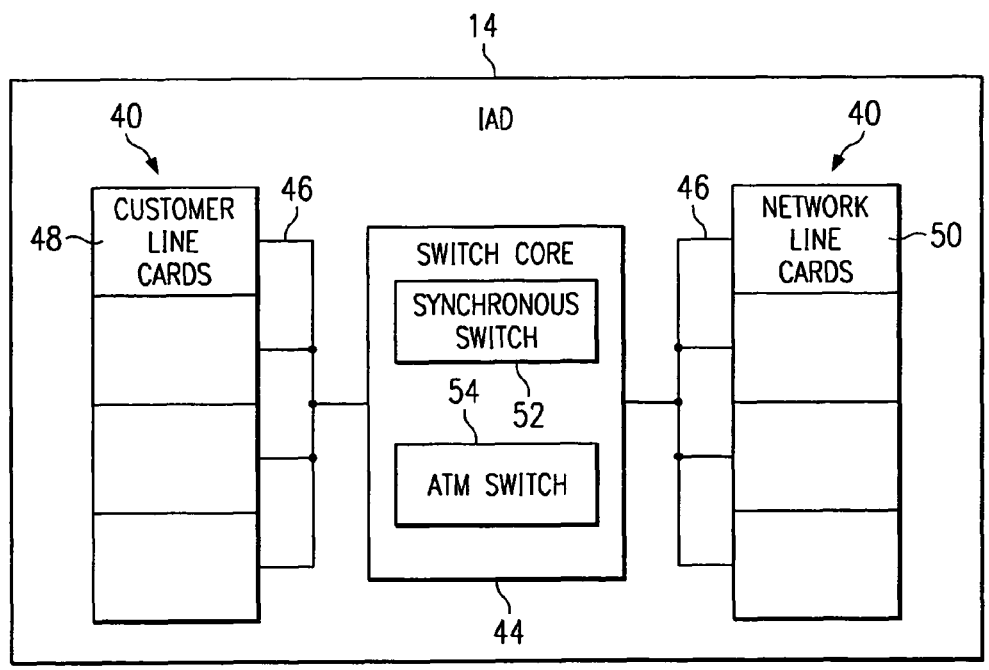
FIG. 2 is a block diagram illustrating a detailed view of a node in the telecommunications system of FIG. 1 in accordance with one embodiment of the present invention.

FIG. 2 illustrates details of the IAD 14 in accordance with one embodiment of the present invention. In this embodiment, the IAD 14 is implemented in a card shelf configuration with functionality of the device distributed between discrete cards connected over a backplane. The backplane includes one or more transmission busses connecting line cards and switch cards. It will be understood that other types of access devices and/or nodes may be used in connection with the present invention.

Referring to FIG. 2, the IAD 14 includes line cards 40, a switch core 44, and a backplane 46. The line cards 40 and switch cards of the switch core 44 each include hardware and software stored in random access memory (RAM), read only memory (ROM), and/or other suitable computer-readable memory for performing switch and other functionality of the cards. The line cards 40 are each a discrete card configured to plug into the backplane 46. Used herein, each means every one of at least a subset of the identified items. The switch core 44 comprises one or more discrete switch cards also configured to plug into the backplane 46.

The line cards 40 include customer line cards 48 and network line cards 50 that communicate traffic with network 16. Each line card 48 and 50 includes one or more external interfaces, or ports, one or more internal interfaces, and a traffic processor. The ports receive ingress traffic from an external line and/or transmit egress traffic received by the internal interfaces from the switch core 44. The internal interfaces transmit ingress traffic received by the ports from the external links and receive egress traffic from the switch core 44. The internal interfaces communicate with the switch core 44 over the backplane 46. The traffic processor is preferably local to the line card 40 and includes hardware and software for processing telephony voice (DS-0) synchronous transmission signal (STS-N) traffic, integrated services digital network (ISDN) traffic, synchronous optical network (SONET) traffic, synchronous digital hierarchy (SDH), asynchronous transfer mode (ATM), and/or other suitable traffic.

The switch core 44 includes a synchronous switch 52 that performs time division multiplex (TDM) switching and an ATM switch 54 that performs cell-based switching. The synchronous switch 52 provides cross-connection for telephony connections, SONET SPEs, other synchronized traffic, and asynchronous traffic segmented into time slots. The ATM switch 54 switches ATM cell traffic, ATM adaption layer (AAL) cell traffic, and segmented packet traffic. The switch core 44 may also convert traffic between the TDM and ATM realms to establish cross-connection between line cards 40.

The switch core 44 or other suitable element of the IAD 14 may implement protection switching for the device 14. In a particular embodiment, 1:N protection switching is provided in the device. In this embodiment, one or more protect line cards 40 provide protection for a number of active line cards 40. When a defect is detected in an active line card 40, the line card 40 is deactivated and the protect line card 40 activated in its place. As described in more detail below, switching instructions are modified within the switch core 44 to correspond to the change in status of the line cards 40.

Figure 3:
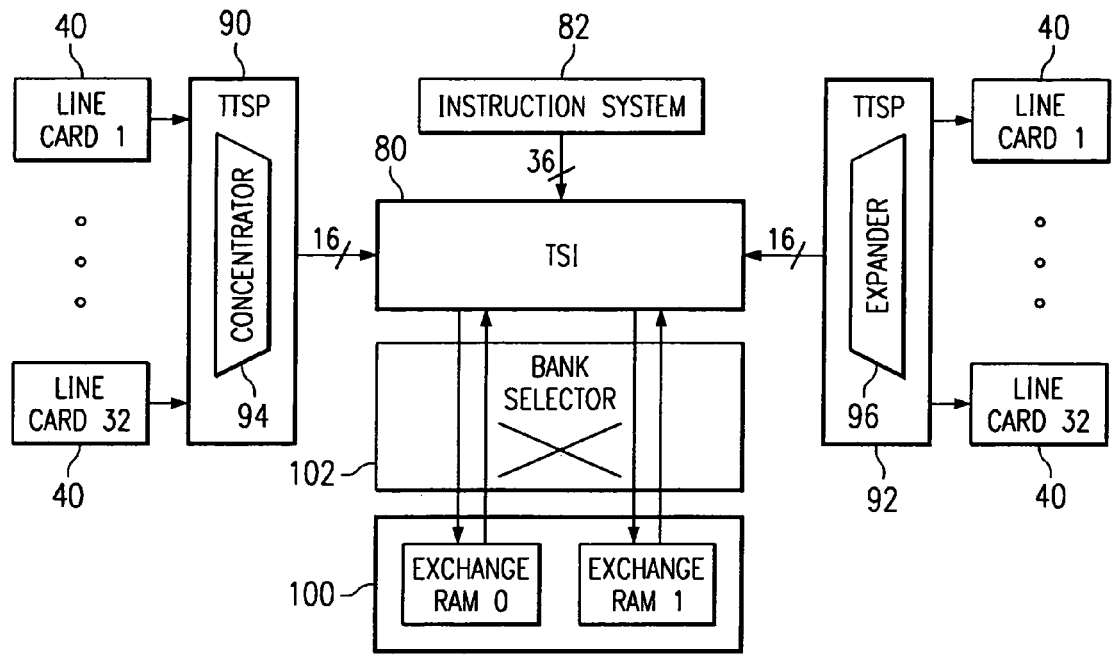
FIG. 3 is a block diagram illustrating details of the synchronous switch of FIG. 2 in accordance with one embodiment of the present invention.

FIG. 3 illustrates the synchronous switch 52 in accordance with one embodiment of the present invention. In this embodiment, the synchronous switch 52 switches 16 bit traffic based on 36 bit instructions. The 16 bit time slots allows channel associated signaling (CAS) and other overhead and/or superframe information to be transported and switched with the traffic. The 36 bit instructions allow sub-channel traffic to be consolidated, expanded, and switched within the synchronous switch 52. Further details regarding the 16 bit time slots and 36 bit instructions are provided in co-owned U.S. patent application Ser. No. 09/452,828, entitled Time Slot Interchanger (TSI) and Method for a Telecommunications Node filed Dec. 1, 1999, which is hereby incorporated by reference.

Referring to FIG. 3, the synchronous switch 52 includes a time slot interchanger (TSI) 80 and an instruction system 82 that provides instruction words to the TSI 80. Based on the instruction words, the TSI 80 performs cross connections between TDM channels of the line cards 40.

The TSI 80 is coupled to the line cards 40 through a time slot bus (TSB), an input TSB timing, synchronization, and protection (TTSP) interface 90 and an output TTSP interface 92. The input TTSP interface 90 includes a serial-to-parallel converter for each line card link and a concentrator 94 that multiplexes together the parallel stream produced by the serial-to-parallel converters. In the illustrated embodiment, the concentrator 94 generates a 16 bit composite stream that is input into the TSI 80. The TSI 80, in turn, generates a 16 bit output stream that is passed to the output TTSP interface 92. The output TTSP interface 92 includes an expander 96 that de-multiplexes and serializes the TSI 80 output for each line card link. The de-multiplex output is serialized by the serializers for transmission to line cards 40.

The TSI 80 is coupled to an exchange memory 100 through a bank selector 102. The exchange memory 100 includes exchange RAM 0 and exchange RAM 1 between which the TSI 80 alternates each frame cycle. In particular, egress traffic is stored into one of the exchange RAMs each frame while traffic from a previous frame is read out of the other exchange RAM during the frame. The bank selector 102 alternately selects each of the exchange RAMs for receiving ingress traffic written to the exchange memory 100 by the TSI 80 or providing egress traffic read from the exchange memory 100 by the TSI 80.

The instruction system 82 is coupled to the TSI 80 and provides program switching instructions to the TSI 80 in the form of instruction words. The instruction words provides read and write operations for transferring DS-0 and other traffic between time slots of the line cards 40. In this way, the TSI 80 cross-connects TDM channels in the IAD 14.

Figure 4:
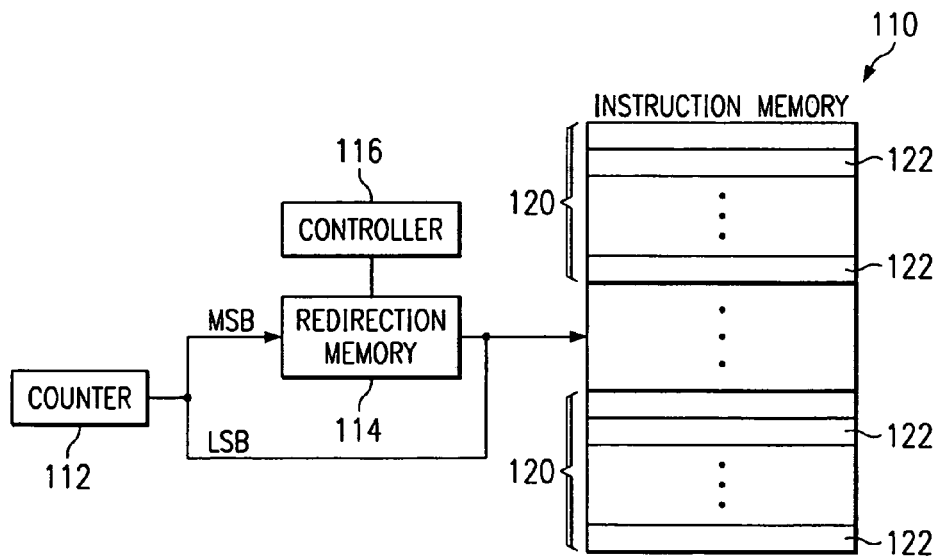
FIG. 4 is a block diagram illustrating a details of the instruction system of FIG. 3 in accordance with one embodiment of the present invention.

FIG. 4 illustrates the instruction system 82 in accordance with one embodiment of the present invention. In this embodiment, the instruction system 82 includes an instruction memory 110, instruction counter 112, redirection memory 114 and a controller 116. It will be understood that the instruction system 82 may include additional or disparate suitable elements without departing from the scope of the present invention.

Referring to FIG. 4, the instruction memory 110 is a RAM or other suitable memory or set of memories capable of storing and providing instructions to the TSI 80. The instruction RAM 110 includes an instruction set 120 for each line card 40 of the IAD 14. Each instruction set 120 includes an instruction 122 for each time slot of the associated line card 40. Thus, the instruction set 120 provides cross-connection information for each time slot of the line card 40. In an exemplary embodiment in which the IAD 14 includes 32 line cards that each have 256 time slots per frame, the instruction RAM 110 includes 32 instruction sets 120 that each have 256 instructions for a total of 8,192 instructions. It will be understood that the size and number of the instruction sets 120 may be suitably varied to correspond to the configuration of the IAD 14.

The counter 112 generates an incrementing count value that, as redirected by the redirection memory 114, sets the order of instructions 122 to be read from the instruction RAM 110 by the TSI 80. The count value is incremented linearly during each frame cycle of the TSI from an initial value that absent redirection represents the first instruction 122 in the first instruction set 120 to a final value that absent redirection represents the last instruction 122 of the last instruction set 120. The total count value corresponds to the number of instructions 122 in the instruction RAM 110. In this way, each instruction 122 is read from the instruction RAM 110 to the TSI 80 during each cycle of the TSI 80. In the exemplary embodiment, the count value is a binary value incremented from zero to 8,191 to read the 8,192 instructions 122 of the instruction RAM 110.

The count value includes a first portion operable to identify the instruction set 120 and a second portion operable to identify the particular instruction 122 in the instruction set 120 to be read. In the exemplary embodiment, the count value is a 12 bit binary value including most significant bits (MSB) 0-4 that identify the instruction set 120 and least significant bits (LSB) 5-11 that identify the location of an instruction 122 relative to an instruction set 120. The MSBs are passed to the redirection memory 114 for redirection in accordance with the current state of the IAD 14 while the LSBs are passed to the instruction RAM 110 to identify an instruction 122 in an instruction set 120 identified by the redirection memory 114 based on the MSBs received from the counter 112. It will be understood that the counter 112 may otherwise suitably identify an instruction set 120 and an instruction 122 and that the count value may be otherwise suitably partitioned for redirection of the instruction set 120 without departing from the scope of the present invention. For example, the counter 112 may include two or more component counters that generate discrete values that together represent the incrementing count value. The counter 112 may be any type of device capable of generating a signal that selects each of the instructions 122 in the instruction RAM 110 in a programmable order.

The redirection memory 114 is a register bank or other suitable type of memory, software, and/or hardware capable of associating an input instruction set 120 identified by the counter 112 with an output instruction set 120 to be read from in the instruction RAM 110, and thus associates each line card 40 with an instruction set 120. The redirection memory 114 adds a level of indirection to the TSI 80. As described in more detail below, the redirection memory 114 allows instruction sets 120 to be selectively associated with the line cards 40 to facility protection switching in the IAD 14 within the time required by telecommunication standards. The redirection register 114 may also allow an instruction set 120 to be associated with a plurality of line cards 40 by listing it as the output instruction sets 120 for the line cards 40. Similarly, instruction sets 120 may be skipped by omitting them in the redirection memory 114.

The controller 116 programs the redirection memory 114 to establish and alter associations between the line cards 40 and the instruction sets 120. The controller 116 may be any suitable type of processor running on program instructions or other logic capable of programming the redirection memory 114 in response to protection switching events within the IAD 14. In one embodiment, the controller 116 may be a processor in the switch core 44 that dynamically programs the redirection memory 114.

Figures 5, 6:
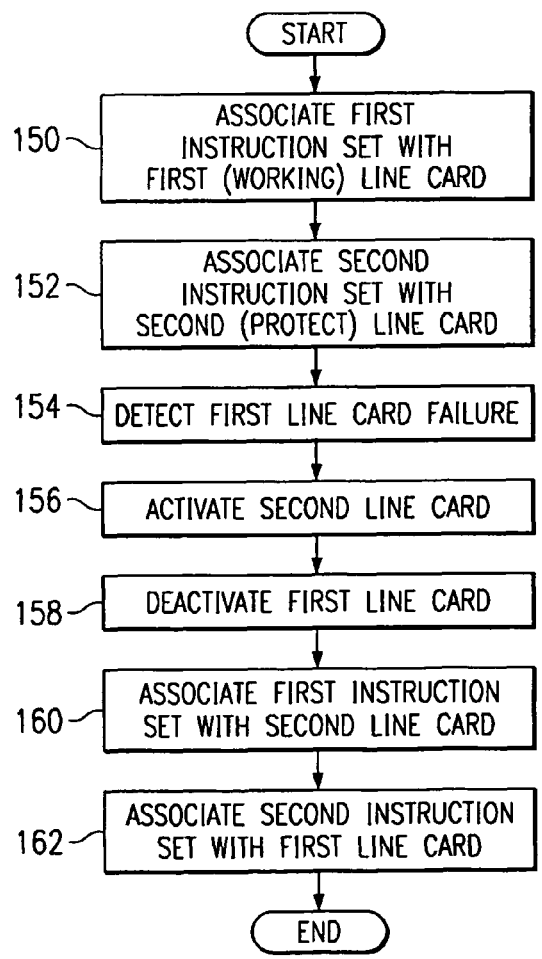
FIG. 5 is a block diagram illustrating details of the redirection memory of FIG. 4 in accordance with one embodiment of the present invention.
FIG. 6 is a flow diagram illustrating a method for reprogramming instructions for the time slot interchanger (TSI) of FIG. 3 in accordance with one embodiment of the present invention.

FIG. 5 is a block diagram illustrating the redirection memory 114 in accordance with one embodiment of the present invention. In this embodiment, the redirection memory 114 is implemented as a register bank 130. The redirection register bank 130 includes an input set of registers 132 and an associated output set of registers 134. The input registers 132 include an identifier for each instruction set 122 in the instruction RAM 110, which corresponds to an instruction set 120 for each line card 40. The input instruction set is used to associate the instruction set identified by the count value with an output instruction set. The output instruction set is programmable by the controller to selectively associate as a unit any instruction set 120 in the instruction RAM 110 with any line card 40.

In operation, the input and output instruction sets in the redirection register bank 130 may be the same when the IAD 14 is under normal operating conditions with no failed line cards 40. In the event of a line card 40 failure and activation of a protect line card 40, the output instruction set 120 for the activated line card 40 is reprogrammed to the instruction set 120 that had been associated with the failed line card 40 to enable the protect line card 40 to perform the instructions, and thus the cross connections for the failed line card 40. Similarly, the output instruction set 120 for the failed line card 40 may be reprogrammed to the instruction set 120 that had been associated with the active line card 40 to allow the failed line card 40 to perform instructions and thus cross connections previously performed by the protect line card 40 to the extent possible. This is typically low priority traffic supported on an as available basis. Reprogramming of the redirection memory 114 may be initiated in response to another suitable event initiating activation of one card in place of another. An action is in response to an event when it is directly or indirectly based on at least the event.

In this way, the TSI 80 is reprogrammed to account for protection switching with only two processor operations. As a result, protection switching occurs rapidly and within the time required by telecommunication standards. For example, upon failure of line card "2" and activation of protect card "30", activated line card "30" is associated with the output instruction set "2" and the failed line card "2" is associated with output instruction set "30". Thus, when the count value indicates that the instructions 122 for line card "30" are to be read, the redirection memory 114 will instead read the instructions for line card "2". Thus, line card "30" will perform the instruction in place of line card 2".

FIG. 6 is a flow diagram illustrating a method for conducting protection switching and reprogramming a switch in accordance with one embodiment of the present invention. The switch may be a synchronous switch, packet switch, ATM switch or other suitable switching system including a plurality of line cards, one or more standby or swappable line cards and routing parameters associated with the line cards. The routing parameters are routing tables, instructions, and other information operable to direct traffic in a switching system.

In the illustrated embodiment, the switch is the TSI 80 and a 1:N protection switching is implemented by the IAD 14. It will be understood that other suitable types of protection switching may be implemented in accordance with the present invention.

Referring to FIG. 6, the method begins at step 150 in which a first instruction set 120 is associated with a first, or working, line card 40. Next, at step 152, a second instruction set 120 is associated with a second, or protect, line card 40. These associations may be made prior to or during operation of the IAD 14. At step 154, failure of the working line card 40 is detected. Next, at step 156, the protect line card 40 is activated. At step 158, the failed line card 40 is deactivated.

Proceeding to step 160, the output instruction set 120 corresponding to the failed line card 40, or the first instruction set 120 is associated with the input instruction set 120 corresponding to the activated line card 40 in the redirection memory 114. At step 158, the output instruction set 120 corresponding to the activated card 40, or second instruction set 120, is associated with the input instruction set 120 corresponding to the failed line card 40 in the redirection memory 114. Accordingly, the activated line card 40 will perform the instructions in place of the failed line card 40. The failed line card 40 will perform the instructions of the activated line card 40, which may cross connect low priority traffic supported on an as available basis or may be a null set. In this way, protection switching is provided with minimal processor operations and in minimal time.

Although the present invention has been described with several embodiments, various changes and modifications may be suggested to one skilled in the art. It is intended that the present invention encompass such changes and modifications as fall within the scope of the appended claims.

What is claimed is:

1. A method for providing instructions to a switch comprising:

generating a count value including a first portion and a second portion, the first portion operable to identify a first instruction set associated with a first line card and the second portion operable to identify a relative location in one of a plurality of instruction sets in an instruction memory for a switch, the count value being a unitary value, the first portion comprising a set of most significant bits (MSB) of the unitary value, the second portion comprising a set of least significant bits (LSB) of the unitary value;

determining a redirection value for the first portion of the count value based on the first portion of the count value, the redirection value operable to identify a second instruction set associated with a second line card, the first portion of the count value operable to identify an initial one of the instruction sets disparate from the instruction set identified by the redirection value; and reading, with a microprocessor, an instruction from a memory from the relative location in the second instruction set based on the redirection value and the second portion of the count value.

2. The method of claim 1, further comprising:

incrementing the count value from an initial value to a final value representing a total number of instructions in the instruction memory, each count value including the first portion and the second portion, the second portion identifying a relative location in one of the instruction sets;

for each count value, determining a redirection value based on the first portion of the count value, the redirection value identifying a targeted one of the instruction sets in the instruction memory; and reading an instruction from the relative location in the targeted instruction set based on the redirection value and the second portion of the count value.

3. The method of claim 1, wherein the switch is a synchronous switch.

4. The method of claim 3, wherein the synchronous switch is a time slot interchanger (TSI).

5. A system for providing instructions to a switch comprising:

a non-transitory computer-readable medium; and software stored on the computer-readable medium, the software operable to generate a count value including a first portion and a second portion, the first portion operable to identify a first instruction set associated with a first line card and the second portion operable to identify a relative location in one of a plurality of instruction sets in an instruction memory for a switch, the count value being a unitary value, the first portion comprising a set of most significant bits (MSB) of the unitary value, the second portion comprising a set of least significant bits (LSB) of the unitary value, to determine a redirection value for the first portion of the count value based on the first portion of the count value, the redirection value operable to identify a second instruction set associated with a second line card, the first portion of the count value operable to identify an initial one of the instruction sets disparate from the instruction set identified by the redirection value, and to read an instruction from the relative location in the second instruction set based on the redirection value and the second portion of the count value.

6. The system of claim 5, the software further operable to increment the count value during a cycle of the synchronous switch from an initial value to a final value representing a total number of instructions in the instruction memory, each count value including the first portion and the second portion, the second portion identifying a relative location in one of the instruction sets, to determine for each count value a redirection value based on the first portion of the count value, the redirection value identifying a targeted one of the instruction sets in the instruction memory, and to read for each count value an instruction from the relative location in the targeted instruction set based on the redirection value and the second portion of the count value.

7. The system of claim 5, wherein the switch is a synchronous.

8. The system of claim 7, wherein the synchronous switch is a time slot interchanger (TSI).

9. An instruction system for a communication switch comprising:
an instruction memory operable to maintain a plurality of instruction sets;
an instruction counter operable to generate a count value including a first portion and a second portion, the first portion operable to identify a first instruction set associated with a first line card and the second portion operable to identify a relative location in one of the instruction sets, the count value being a unitary value, the first portion comprising a set of most significant bits (MSB) of the unitary value, the second portion comprising a set of least significant bits (LSB) of the unitary value;
a redirection memory operable to determine a redirection value for the first portion of the count value based on the first portion of the count value, the redirection value operable to identify a second instruction set associated with a second line card, the first portion of the count value operable to identify an initial one of the instruction sets disparate from the instruction set identified by the redirection value, and
the instruction memory further operable to read an instruction from the relative location in the second instruction set based on the redirection value and the second portion of the count value.

10. The instruction system of claim 9, wherein:
the instruction counter is further operable to increment the count value from an initial value to a final value representing a total number of instructions in the instruction memory, each count value including the first portion and the second portion, the second portion identifying a relative location in one of the instruction sets;
the redirection memory is further operable, for each count value, to determine a redirection value based on the first portion of the count value, the redirection value identifying a targeted one of the instruction sets in the instruction memory; and
the instruction memory is further operable to read an instruction from the relative location in the targeted instruction set based on the redirection value and the second portion of the count value.

11. The instruction system of claim 9, wherein the switch is a synchronous switch.

12. The instruction system of claim 11, wherein the synchronous switch is a time slot interchanger (TSI).

13. An instruction system for a communication switch comprising:
means for generating a count value including a first portion and a second portion, the first portion operable to identify a first instruction set associated with a first line card and the second portion operable to identify a relative location in one of a plurality of instruction sets in an instruction memory for a switch, the count value being a unitary value, the first portion comprising a set of most significant bits (MSB) of the unitary value, the second portion comprising a set of least significant bits (LSB) of the unitary value;
means for determining a redirection value for the first portion of the count value based on the first portion of the count value, the redirection value operable to identify a second instruction set associated with a second line card, the first portion of the count value operable to identify an initial one of the instruction sets disparate from the instruction set identified by the redirection value; and
means for reading an instruction from the relative location in the second instruction set based on the redirection value and the second portion of the count value.

14. The instruction system of claim 13, further comprising:
means for incrementing the count value from an initial value to a final value representing a total number of instructions in the instruction memory, each count value including the first portion and the second portion, the second portion identifying a relative location in one of the instruction sets;
means for, for each count value, determining a redirection value based on the first portion of the count value, the redirection value identifying a targeted one of the instruction sets in the instruction memory; and
means for reading an instruction from the relative location in the targeted instruction set based on the redirection value and the second portion of the count value.

15. The method of claim 1, wherein the redirection value is determined based on the first portion of the count value and the presence of a defect within the switch.

16. The system of claim 5, wherein the redirection value is determined based on the first portion of the count value and the presence of a defect within the switch.

17. The instruction system of claim 9, wherein the redirection value is determined based on the first portion of the count value and the presence of a defect within the switch.

18. The instruction system of claim 13, wherein the redirection value is determined based on the first portion of the count value and the presence of a defect within the switch.

* * * * *